United States Patent
Proler

[11] Patent Number: 5,964,920
[45] Date of Patent: Oct. 12, 1999

[54] METHOD AND APPARATUS FOR REDUCTION OF METAL PARTICULATES

[75] Inventor: Sam Proler, Miami, Fla.

[73] Assignee: Prolerflo Corporation, Miami, Fla.

[21] Appl. No.: 08/824,807

[22] Filed: Mar. 26, 1997

Related U.S. Application Data

[60] Provisional application No. 60/014,653, Apr. 2, 1996, and provisional application No. 60/030,167, Nov. 13, 1996.

[51] Int. Cl.$^6$ .................................................... C22B 9/00
[52] U.S. Cl. .............................. 75/583; 266/90; 266/234
[58] Field of Search .................................. 266/234, 237, 266/239, 78, 90; 75/583

[56] References Cited

U.S. PATENT DOCUMENTS

| | | | |
|---|---|---|---|
| 3,314,670 | 4/1967 | Kennedy | 266/234 |
| 3,881,915 | 5/1975 | Proler | 75/11 |
| 3,929,465 | 12/1975 | Proler | 75/65 R |
| 4,406,695 | 9/1983 | Gardner | 266/277 |
| 4,444,378 | 4/1984 | Reese | 266/277 |

*Primary Examiner*—Scott Kastler
*Attorney, Agent, or Firm*—Gifford, Krass, Groh, Sprinkle, Anderson & Citkowski, P.C.

[57] ABSTRACT

The invention disclosed herein utilizes magnetic forces to draw metal particles having magnetic characteristics into and beneath the surface of a molten metal stream flowing through a non-magnetic trough. The apparatus of the present invention includes a declined non-magnetic trough having an interior channel. Means are provided for introducing a molten metal stream into the trough. A magnetic source is provided which produces a magnetic field having flux lines which extend through the non-magnetic trough and to at least the surface of the molten metal stream. A particle discharge mechanism having contained therein substantially ferromagnetic metal particles is positioned above the surface of the molten metal stream. Gravity draws the metal particles onto the surface of the stream and the particles are drawn beneath the surface of the stream by the magnetic field.

2 Claims, 6 Drawing Sheets

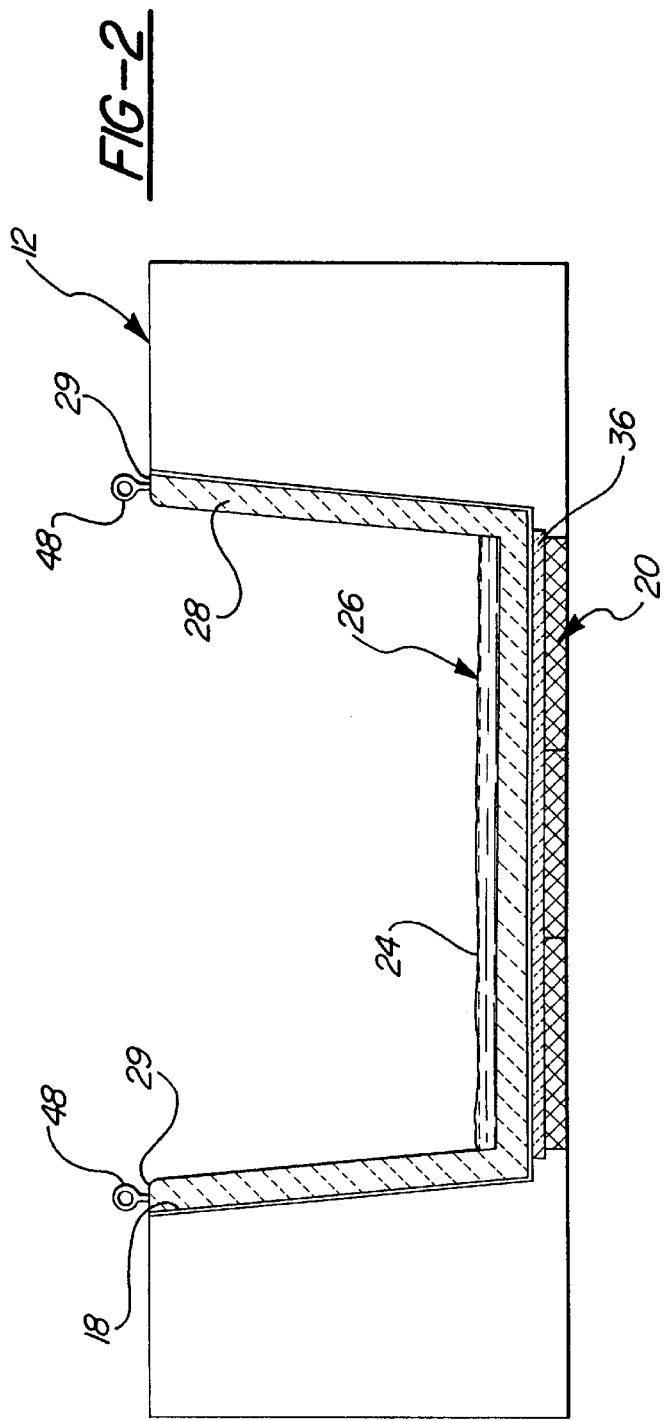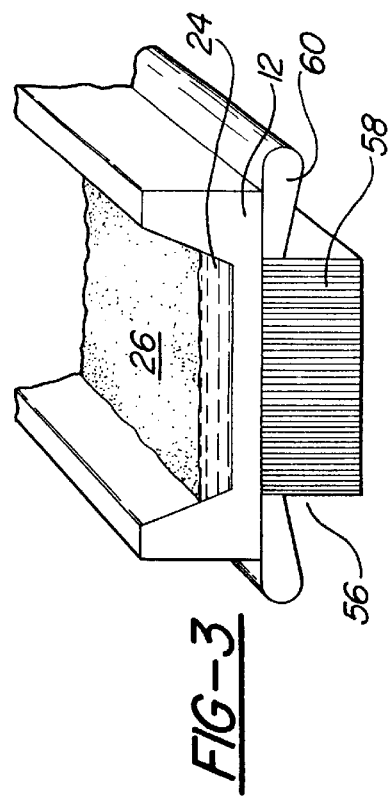

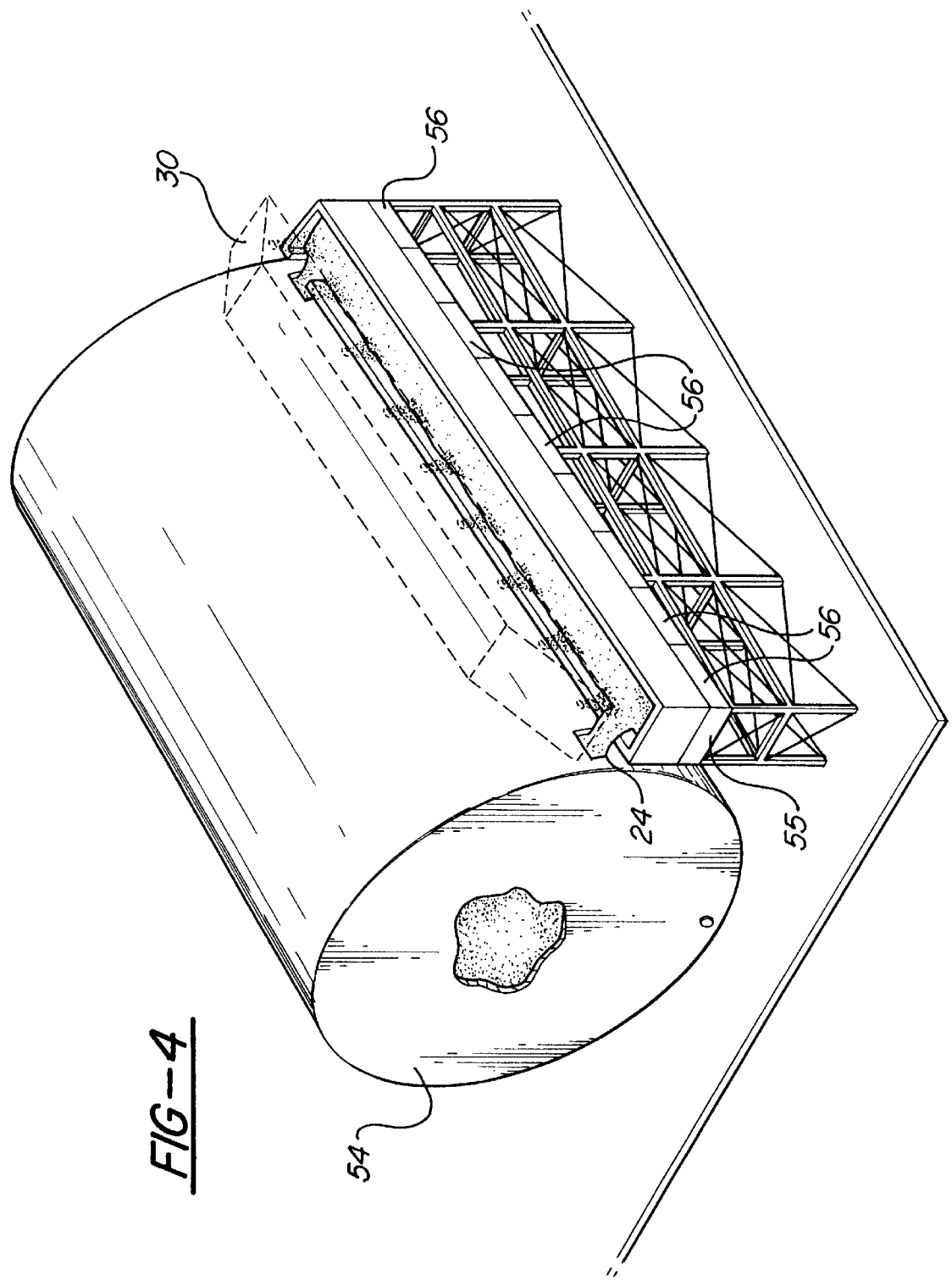

METHOD AND APPARATUS FOR REDUCTION OF METAL PARTICULATES

This application claims the benefit of U.S. Provisional Application No(s):
60/014,653 Filed Apr. 2, 1996
60/030,167 Filed Nov. 13, 1996.

FIELD OF THE INVENTION

The present invention relates generally to an apparatus and method for reclaiming particles such as scrap or by-products of manufacturing processes by introducing the metal particles into a stream of molten metal flowing through a trough and utilizing the forces of magnetic attraction to draw the particles into the stream where they are reduced and/or melted and, more particularly, to the utilization of a non-magnetic trough in such an apparatus and method.

BACKGROUND OF THE INVENTION

Steel is manufactured by "reducing" iron ore in a blast furnace. This process generates scrap and by-products of ores and oxides such as BOF dust, mill scale and the like. Because this scrap and by-products are fine grain and powder-like in size, these particles are too small to be easily used in the steel-making process and typically must be sintered before they are suitable for use in steel-making. Several prior art systems have attempted to reintroduce these particles into a flowing stream of hot metal. Most of the particles which are introduced into the stream merely float on the surface of the stream due to their light weight and slow wetting action. As more particles are added to the stream of hot metal, the particles "freeze up" and form a dam at the area of introduction. Thus, relatively little use of these particles is possible in the manufacture of steel without prior processing of the particles.

My U.S. Pat. No. 3,881,915 ('915) discloses a process for enhancing the reduction of such scrap and by-products added to a molten metal stream by utilizing magnetic forces. The '915 patent discloses a process whereby a substantially continuous charge of metallic particulates is introduced onto the surface of a substantially continuous molten metal stream which flows through a conventional trough. A magnetic field, emanating from beneath the trough and extending through the trough and stream, forces the metal particles into and beneath the surface of the stream and holds them at or beneath the surface until their temperature exceeds the Curie temperature and they are no longer attracted by the magnetic field, thereby accelerating the dissolution or chemical reaction of the particulates by exposure to the heat and movement of the stream.

Conventional troughs are typically comprised of steel and permit only a small portion of the magnetic flux to pass through the trough as the trough itself becomes magnetized. To ensure extension of the magnetic flux through the conventional trough and into the metal stream, a powerful magnetic source must be used. Thus, the magnetic characteristics of conventional troughs render them less than ideal for use in the reduction of metal particulates using magnetic forces.

SUMMARY OF THE INVENTION

The invention disclosed herein overcomes problems present in prior art systems which utilize magnetic forces to draw metal particles having magnetic characteristics into and beneath the surface of a molten metal stream flowing through a trough until such particles have been heated to beyond their Curie Point by utilizing a non-magnetic trough.

The method of the present invention includes the steps of providing a non-magnetic trough and moving molten metal through the non-magnetic trough using an electromagnetic conveying device, gravity or other movement means. Metal particles which are substantially ferromagnetic are introduced onto the surface of the molten metal from a particle discharge mechanism disposed above the non-magnetic trough. A magnetic field is applied to the molten metal, the magnetic field having sufficient strength to extend through the non-magnetic trough and molten metal to at least the surface of the metal stream. The particles are drawn beneath the surface of the stream by the magnetic field and are subsequently reduced by the heat of the stream.

The apparatus of the present invention includes a declined non-magnetic trough having an interior channel. Means are provided for introducing a molten metal stream into the trough. A magnetic source is provided which produces a magnetic field having flux lines which extend through the non-magnetic trough and to at least the surface of the molten metal stream. A particle discharge mechanism having contained therein substantially ferromagnetic metal particles is positioned above the surface of the molten metal stream. Gravity draws the metal particles onto the surface of the stream and the particles are drawn beneath the surface of the stream by the magnetic field.

A refractory liner is preferably disposed in the interior channel of the non-magnetic trough and includes hooks positioned on its upper edge which enable the liner to be easily removed from the trough. Additionally, the non-magnetic trough and/or refractory liner may be configured to produce non-laminar flow in the molten metal stream, thereby enhancing the reduction of the metal particles distributed onto the stream.

The temperature of the magnetic source may be maintained within appropriate limits by providing an insulator between the magnetic source and non-magnetic trough or providing other means to cool the magnetic source such as a liquid cooling system.

The apparatus of the present invention may also include an electromagnetic conveying device to move the molten metal through the non-magnetic trough.

Other objects, advantages and applications of the present invention will be made clear by the following detailed description of the preferred embodiment of the invention. The description makes reference to drawings in which:

BRIEF DESCRIPTION OF THE DRAWINGS

FIG. 2 is a cross-sectional view of the apparatus depicted in FIG. 1 along lines 2—2;

FIG. 3 is a cross-sectional view of an electromagnetic induction conveyor;

FIG. 4 is a perspective view of an alternate embodiment of the present invention;

DETAILED DESCRIPTION OF THE INVENTION

Figure 1:
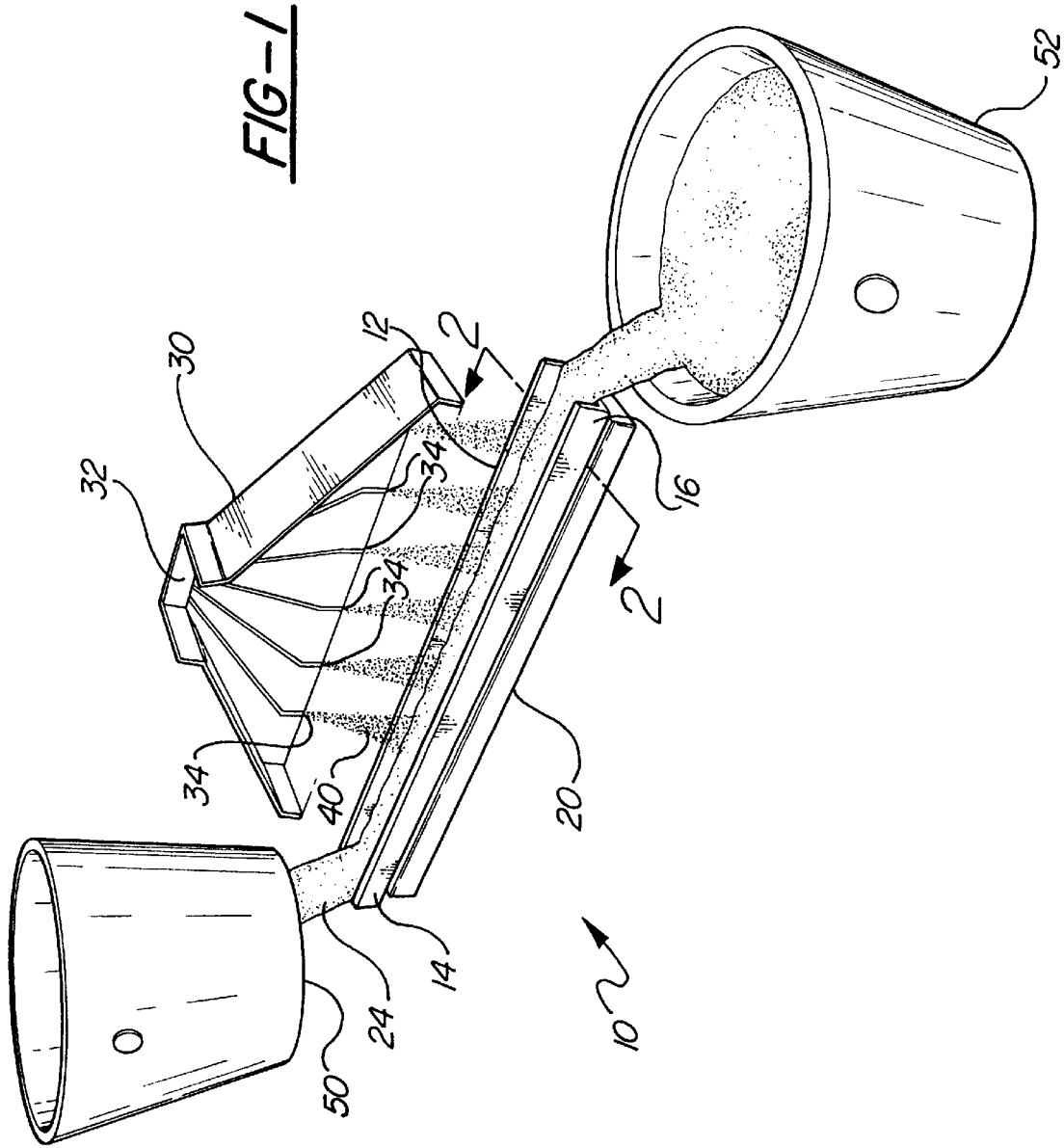
FIG. 1 is a perspective view of the apparatus of the present invention.

As used in this application, the term "magnetic" shall mean magnetized, being capable of being magnetized, or capable of being attracted by a magnet. The term "magnetic permeability," as used in this application, shall mean the ability of a substance to concentrate within itself an applied magnetic field. The term "ferromagnetic," as used in this application, shall refer or relate to a class of substances characterized by abnormally high magnetic permeability and appreciable residual magnetism and hysteresis, the class including iron, steel, nickel, and cobalt. As used in this application, the term "non-magnetic" shall refer or relate to a class of substances lacking the capability of being significantly attracted by a magnet, the class including aluminum (which is paramagnetic and only weakly attracted by a magnetic field) or copper (which is diamagnetic and tends to be weakly repelled by a magnetic field).

The invention disclosed herein is a method and apparatus for introducing metal particles into a stream of molten metal flowing through a non-magnetic trough by utilizing a magnetic field to draw the particles into and beneath the stream until they have been heated to beyond their Curie Point and are no longer magnetically attractive. The term "reactor" shall hereinafter refer to the apparatus of the present invention. The reactor, shown in FIG. 1 at 10, includes a declined non-magnetic trough 12 having an inlet 14 and outlet 16. Preferably, trough 12 is constructed of a metal such as stainless steel, manganese, aluminum or copper, although troughs constructed of non-metallic materials such as ceramic may also be used. In the preferred embodiment, trough 12 includes an interior channel 18 which is preferably U-shaped.

A refractory liner 28, comprised of a material capable of withstanding temperatures normally found in the manufacture of molten metal such as iron and steel, is disposed between the surface of interior channel 18 of trough 12 and molten metal stream 24. The refractory liner 28 protects trough 12 from the extreme temperature of the molten metal 24. Liner 28 may be composed of a variety of refractories including aluminum silicates, silicas, high aluminum, mullite, magnesite, dolomite, tungsten or tantalum. Preferably, the refractory liner 28 has hooks 48 on its upper edge 29, which enable it to be easily removed from the reactor so that it may be repaired or replaced.

Means are provided for introducing a molten metal stream into the trough. As shown in FIG. 1, molten metal 24 flows from a source of molten metal 50 such as a container, ladle, furnace or the like, through the inlet 14 of trough 12, the refractory liner 28 and through the outlet 16. Receptacle 52, which may be a container, ladle, furnace or the like, is positioned proximate to outlet 16 to receive the molten metal 24. As shown in FIG. 4, source 50 and receptacle 52 may be the same object, such as furnace 54. This configuration permits heat to be added to the molten metal stream after the introduction of particles 40.

The molten metal 24 flowing through non-magnetic trough 12 is preferably heated above its Curie Point, which is the temperature at which there is a transition between the ferromagnetic and paramagnetic phases, and the temperature at which the anomalies which characterize a ferromagnetic substance disappear. For example, the Curie Point for iron is 770° C., 350° C. for nickel, and 1,120° C. for cobalt.

Preferably, gravity is used to create flow through inclined non-magnetic trough 12 and refractory liner 28 as shown in FIG. 1. Other means of causing movement in the molten metal may be used, such as an electromagnetic conveying device 55 depicted in FIGS. 3, 4 and 5.

Figure 5:
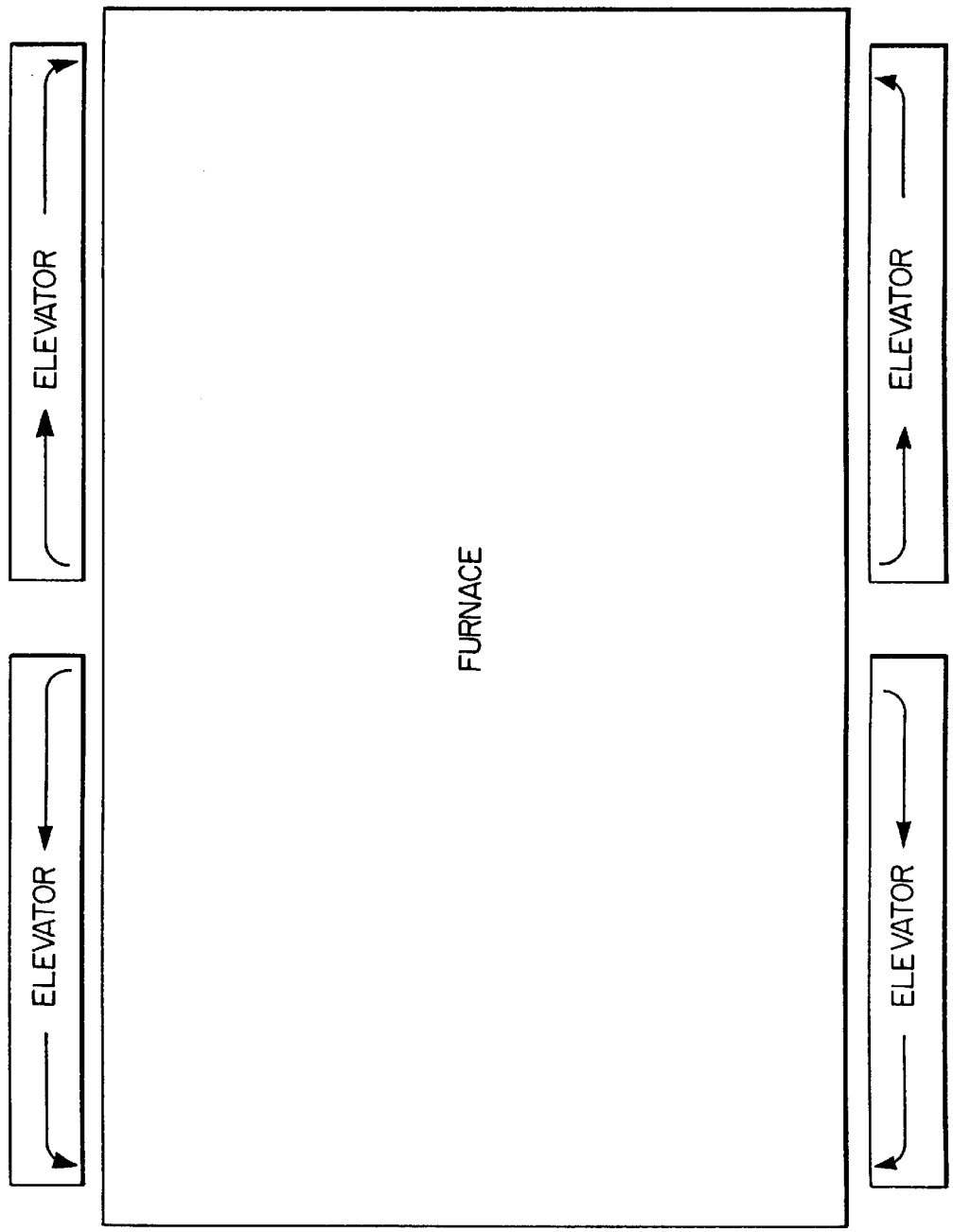
FIG. 5 is a plan view of an alternate embodiment of the present invention.
Figure 6:
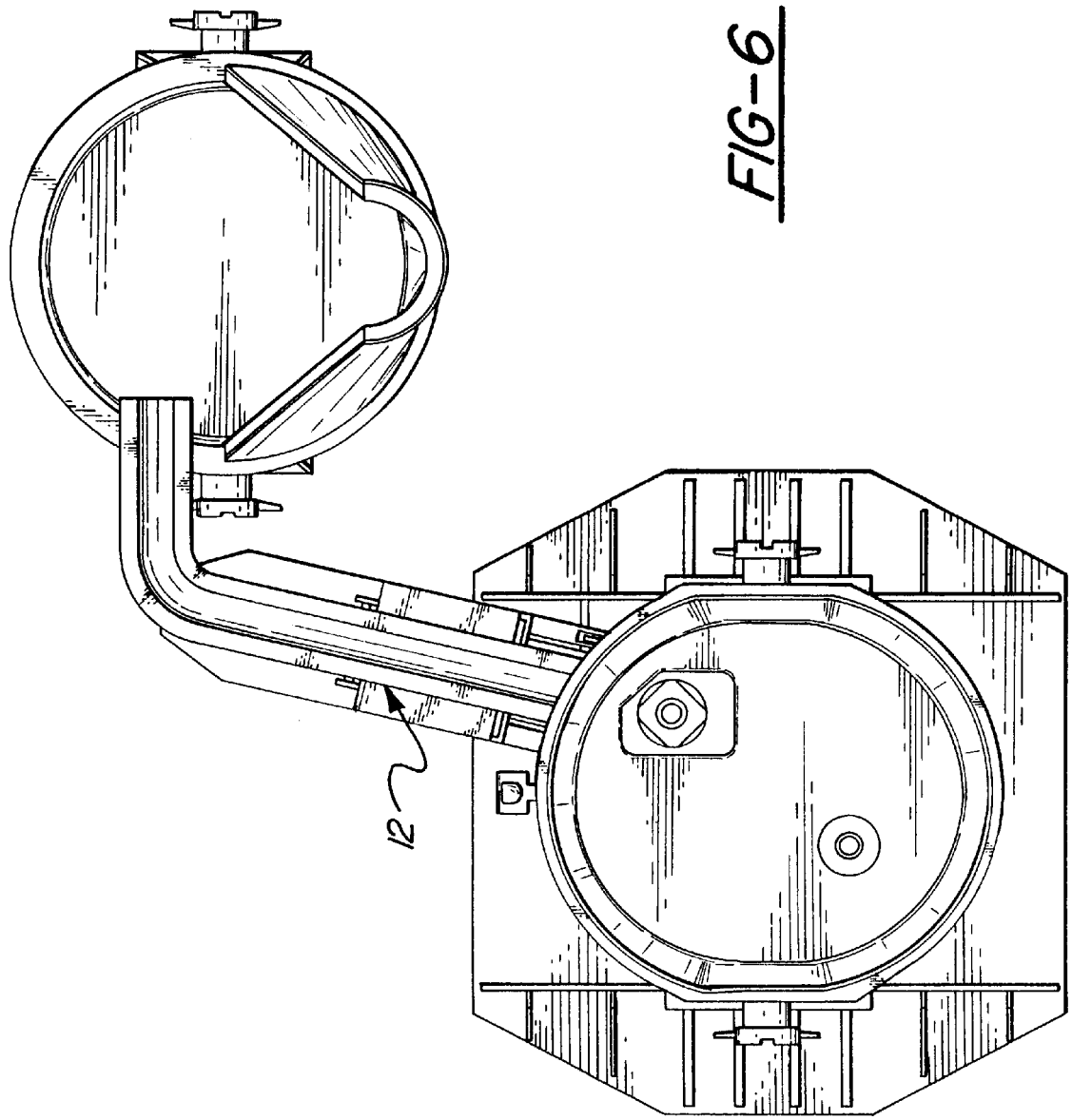
FIG. 6 is a plan view of an alternate embodiment of the present invention.
Figure 7:
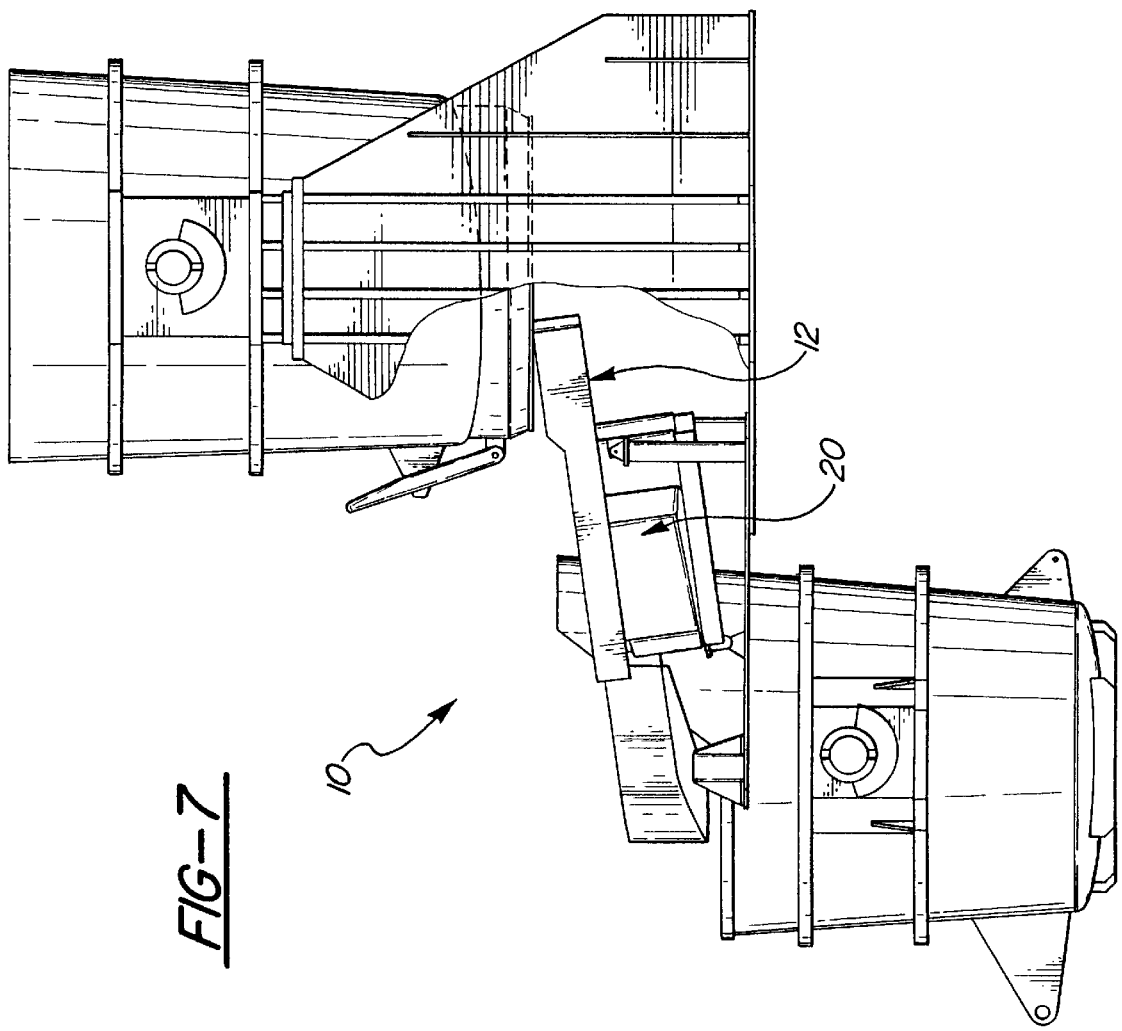
FIG. 7 is a side view of the embodiment depicted in FIG. 6.

Electromagnetic conveying device 55 functions in a manner similar to a linear induction motor, with the liquid metal replacing the rotor. As shown in FIG. 3, an inductor 56, or primary, is placed below non-magnetic trough 12. Inductor 56 includes a solid core 58 and winding 60, shown in cross-section in FIG. 3. Inductor 56 is supplied with two or more alternating currents which are out of phase with each other. These currents produce a rotating magnetic field even though the winding is physically stationary. The rotating magnetic field induces a voltage in the molten metal stream 24, which results in circulating currents. The reaction between the circulating currents and the rotating field produces movement in the molten metal. Thus, the molten metal may be moved "uphill" as shown in FIGS. 4 and 5 so as to circulate molten metal into and out of furnace 54. The use of non-magnetic trough 12 permits a more efficient use of the magnetic field generated by inductor 56, thus allowing use of a weaker field to achieve the same results. For a detailed discussion of electromagnetic conveying devices, see *Travelling field channel conveyors for liquid metals*, S. Husmann and A. von Starck, AGG—Telefunken Progress (1971)(2).

Positioned above non-magnetic trough 12 is a particle discharge mechanism 30 having a particle inlet 32 and a plurality of particle outlets 34. Metal particles 40, disposed within particle discharge mechanism 30, are substantially ferromagnetic. Ferromagnetic particles are strongly attracted by magnets and include metals such as iron, nickel, cobalt and the like. Metal particles 40 preferably consist of iron or steel scraps from various machining processes, but may also include iron or steel particles from melting and slag facilities, shot blast iron and steel dust, mill scale, BOF dust, and blast furnace oxides. Particles 40 may vary in size, but are preferably fine particles such as dust.

Particles 40 are distributed over upper surface 26 of molten metal stream 24 as it moves through non-magnetic trough 12. In the embodiment depicted in FIG. 1, the particle discharge mechanism includes six particle outlets 34. Each outlet 34 is preferably rectangular, having a length of approximately one inch and a width of approximately twelve inches, which is less than the width of the molten metal stream. As oxide particles are deposited on and drawn into the stream, the oxide particles react with the carbon in the molten metal releasing carbon monoxide which bubbles to the surface of the stream. The outlets 34 are preferably spaced apart from one another by at least six inches, thus permitting sufficient molten metal to pass beneath each outlet 34 so that the particles released from each opening do not impede the flow of the stream.

At least one magnetic element 20 is positioned in close proximity to trough 12, and is preferably positioned beneath trough 12 as shown in FIG. 2. Preferably, the outlets 34 of the particle discharge mechanism 30 are each positioned above a magnetic element. Electromagnets or permanent magnets may be utilized as magnetic elements 20. A thermal insulator 36 is preferably disposed between magnets 20 and trough 12 to prevent heat dissipated by trough 12 from disabling the magnets by burning the coils of an electromagnet or dissipating the magnetic flux of a permanent magnet. Such an insulating layer is depicted is FIG. 2, and preferably includes a thermal insulating material, a non-magnetic cover plate which is preferably metal, and an air gap.

The magnetic field generated by magnetic elements 20 is sufficiently strong so as to extend through insulator 36, non-magnetic trough 12, refractory liner 28, and to at least upper surface 26 of molten metal stream 24. The magnetic field draws metal particles 40 into and beneath surface 26 of the molten metal 24 and retains them within the molten metal until particles 34 have dissolved or been reduced.

In the embodiment shown in FIG. 2, interior channel 18 of non-magnetic trough 12 is approximately U-shaped. The refractory liner 28 is positioned within non-magnetic trough 12 and is also U-shaped. The molten metal stream should have a width of 18 inches and a depth of less than one inch. In the preferred embodiment, the stream should be at least six inches wide and five-eighths to three-quarters of an inch deep over the magnetic source. This permits the molten metal stream 24 to have a surface area sufficiently large to permit the addition of a significant amount of metal particles 34 without interrupting the flow of molten metal through trough 12. In the preferred embodiment, the molten metal flows through the trough at a rate of at least 130 ft-lbs per second. The interior dimensions of the liner may vary considerably and still remain within the scope of the present invention.

The width of magnet 20 preferably approximates the bottom width of the refractory liner, which controls the width of the stream of molten metal.

In order to achieve maximum results, the specific velocity, volume and temperature of the stream of molten metal must be precisely controlled and correlated to the particular Gauss strength of the magnets. Preferably, the weight ratio of metal particles added to stream 24 does not exceed 1 to 15, although other weight ratios may be utilized. For gravity fed reactors, the rate of flow of particles 40 from particle discharge mechanism 34 (particle flow rate) must be proportional to the rate of flow of molten metal 24 through non-magnetic trough 12.

Preferably, the metal stream contains at least 4½% carbon, as approximately 1% of the carbon present in the molten metal is utilized to reduce the metal oxide particles added to the stream.

Particles 40, when heated beyond their Curie Point, lose their magnetic properties. As particles 40 leave the particle discharge mechanism, they are drawn to the surface 28 of the molten metal 26 by gravity and the magnetic flux extending above the surface of the molten metal. As particles 40 come to rest on surface 28, they are drawn into the molten metal by the magnetic field.

In most instances, the flow of molten metal within the trough may be characterized as laminar. To enhance the reduction of particles which are distributed on surface 28 of stream 24, the laminar flow may be disturbed, creating non-laminar flow in the molten metal. The inner surface of the refractory liner and/or trough may be configured to create such non-laminar flow. Alternately, obstructions may be placed in the path of the molten metal stream. It is not necessary to create turbulent flow within the molten metal to enhance the reduction of particles, rather it is sufficient to disturb the molten metal so that the streamline flow of the molten metal is disrupted.

In the method of the present invention, a non-magnetic trough having a refractory liner is provided through which molten metal is moved from the inlet of the non-magnetic trough to the outlet of the non-magnetic trough, the molten metal being substantially ferrous and heated beyond its Curie Point.

A particle discharge mechanism is provided having loaded therein metal particles which are substantially ferromagnetic. The particle discharge mechanism is positioned above the molten metal flowing through the non-magnetic trough. Particles are released from the discharge mechanism so that substantially all of the particles contact the surface of the molten metal flowing through the non-magnetic trough. A magnetic field having sufficient strength to extend to the surface of the molten metal is applied through the non-magnetic trough in the vicinity of the released particles so that the metal particles are drawn beneath the surface of the molten metal by the magnetic field until they are heated to their Curie Point and lose their ferromagnetic characteristics.

The molten metal may be subjected to a rotating magnetic field which produces circulating currents in the molten metal, the interaction between the rotating magnetic field and the circulating currents inducing movement in the molten metal. Preferably, molten metal is taken from a furnace, moved through the non-magnetic stream wherein ferromagnetic particles are added to the stream, the magnetic field applied to the stream so that the particles are drawn into the stream, and the stream returned to the furnace.

The method of the present invention may include inducing non-laminar flow in the molten metal by disturbing the laminar flow of the stream.

The elements of the present invention are interrelated and a wide variety of parameter combinations may be used successfully in the present invention. For example, 200 tons of molten iron at a temperature of 2,750° F. which contains 4½% carbon and traces of silicon and manganese may be moved by gravity through a declined trough in one hour. As this molten iron flows beneath the particle discharge mechanism, 13.8 tons of mill scale containing approximately 70% iron are deposited onto the surface of the molten iron and drawn beneath the surface by the magnetic field. There is a temperature loss in the resultant metal of 100° F., a decrease in the percent of carbon to 3½%, and an increase in the weight of the resultant metal by 9.6 tons. As the flow rate of the molten metal through the stream changes, the weight of particles which may be added to the stream decreases and the characteristics of the resultant metal are altered. Many characteristics of the present invention may be varied without departing from the scope of this invention.

Having described the various embodiments of the present invention with references to the accompanying figures, it will be appreciated that various changes and modifications can be made without departing from the scope or spirit of the invention.

What is claimed is:

1. A method for adding metal particles which are substantially ferromagnetic into molten metal, to achieve a desired level of mixing of the particles within the molten metal, the method comprising the steps of:

providing a non-magnetic trough having a refractory liner;

moving substantially ferrous molten metal which has been heated beyond its Curie Point through the non-magnetic trough;

providing a particle discharge mechanism having loaded therein metal particles which are substantially ferromagnetic, the particle discharge mechanism positioned above the molten metal flowing through the non-magnetic trough;

releasing the metal particles from the particle discharge mechanism so that substantially all of the released metal particles contact the surface of the molten metal;

applying a magnetic field having a Gauss strength to the molten metal flowing through the nonmagnetic trough and refractory liner in the vicinity of the released particles, the magnetic field having sufficient strength to extend to the surface of the molten metal so that the metal particles are drawn beneath the surface of the molten metal by the magnetic field;

monitoring a characteristic of the flowing molten metal selected from the group consisting of the velocity of the flowing molten metal, the volume of the flowing molten metal, and the temperature of the flowing molten metal; and controlling the characteristic so as to be correlated to the Gauss strength of the magnetic field to achieve the desired level of mixing of the particles within the molten metal.

2. Apparatus for adding metal particles which are substantially ferromagnetic into a stream of molten metal comprising:

a inclined trough of stainless steel having an interior channel;

a refractory liner disposed in the interior channel of the non-magnetic trough;

means for introducing a molten metal stream into the refractory liner of the non-magnetic trough, the non-magnetic trough and refractory liner being configured to create non-laminar flow in the molten metal stream;

a liquid cooled magnetic source disposed below said trough operative to produce a magnetic field having flux lines which extend through the non-magnetic trough, the refractory liner, and to at least the surface of the molten metal stream;

an insulator disposed between the magnetic source and non-magnetic trough;

a particle discharge mechanism having contained therein substantially ferromagnetic metal particles, disposed above the trough to discharge the metal particles;

means for monitoring a characteristic of the flowing molten metal selected from the group consisting of the velocity of the flowing molten metal, the volume of the flowing molten metal, and the temperature of the flowing molten metal; and means for controlling the characteristic so as to be correlated to the Gauss strength of the magnetic field to achieve the desired level of mixing of the particles within the molten metal;

whereby the metal particles distributed onto the surfaces of the molten metal stream are drawn beneath the surface of the molten metal stream by the magnetic field.

* * * * *